(12) United States Patent
Fripp et al.

(10) Patent No.: US 10,138,701 B2
(45) Date of Patent: Nov. 27, 2018

(54) SWAB-RESISTANT DOWNHOLE TOOLS COMPRISING SEALING ELEMENTS COMPOSED OF SHAPE MEMORY POLYMERS

(71) Applicant: Halliburton Energy Services, Inc., Houston, TX (US)

(72) Inventors: Michael Linley Fripp, Carrollton, TX (US); Zachary Ryan Murphree, Dallas, TX (US); Xiaoguang Allan Zhong, Plano, TX (US); Thomas Frosell, Irving, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 15/116,311

(22) PCT Filed: Apr. 24, 2014

(86) PCT No.: PCT/US2014/035302
§ 371 (c)(1),
(2) Date: Aug. 3, 2016

(87) PCT Pub. No.: WO2015/163887
PCT Pub. Date: Oct. 29, 2015

(65) Prior Publication Data
US 2017/0009552 A1    Jan. 12, 2017

(51) Int. Cl.
| | | |
|---|---|---|
| *E21B 33/128* | (2006.01) | |
| *E21B 33/12* | (2006.01) | |
| *E21B 33/134* | (2006.01) | |
| *C08J 5/00* | (2006.01) | |
| *C09K 8/50* | (2006.01) | |
| *E21B 43/14* | (2006.01) | |
| *E21B 33/16* | (2006.01) | |

(Continued)

(52) U.S. Cl.
CPC ............. *E21B 33/1208* (2013.01); *C08J 5/00* (2013.01); *C09K 8/50* (2013.01); *E21B 33/134* (2013.01); *E21B 43/14* (2013.01); *C08J 2300/12* (2013.01); *E21B 33/16* (2013.01); *E21B 43/088* (2013.01); *E21B 43/26* (2013.01)

(58) Field of Classification Search
CPC ....... E21B 33/10; E21B 33/12; E21B 33/1208
See application file for complete search history.

(56) References Cited

U.S. PATENT DOCUMENTS

| | | | | |
|---|---|---|---|---|
| 6,896,063 B2 * | 5/2005 | Chang | ..................... | E21B 29/10 166/135 |
| 8,678,100 B2 * | 3/2014 | Guest | .................. | E21B 33/1208 166/302 |

(Continued)

OTHER PUBLICATIONS

International Search Report and Written Opinion for PCT/US2014/035302 dated Jan. 22, 2015.

*Primary Examiner* — Kenneth L Thompson
(74) *Attorney, Agent, or Firm* — McGuireWoods LLP

(57) ABSTRACT

A swab-resistant downhole tool comprising a body and a sealing element, wherein at least a portion of the sealing element is composed of a shape memory polymer, the shape memory polymer having a glass transition temperature ("Tg"), and exhibiting a resilient characteristic above the Tg and a rigid characteristic below the Tg, and wherein the Tg is in the range of about 50° C. to about 150° C.

22 Claims, 3 Drawing Sheets

(51) Int. Cl.
*E21B 43/08* (2006.01)
*E21B 43/26* (2006.01)

(56) References Cited

U.S. PATENT DOCUMENTS

| | | | | |
|---|---|---|---|---|
| 8,714,241 | B2 * | 5/2014 | Joseph | E21B 29/10 |
| | | | | 166/179 |
| 8,739,408 | B2 * | 6/2014 | Duan | E21B 23/06 |
| | | | | 29/890.14 |
| 8,960,314 | B2 * | 2/2015 | Ramon | E21B 33/12 |
| | | | | 166/179 |
| 9,567,821 | B2 * | 2/2017 | Bramwell | E21B 33/1208 |
| 9,777,548 | B2 * | 10/2017 | Prieto | E21B 33/1208 |
| 9,878,486 | B2 * | 1/2018 | Liu | B29C 61/04 |
| 2008/0296023 | A1 | 12/2008 | Willauer | |
| 2011/0067873 | A1 | 3/2011 | Barnard et al. | |
| 2011/0259587 | A1 | 10/2011 | Joseph et al. | |
| 2012/0175845 | A1 | 7/2012 | Duan et al. | |
| 2012/0248703 | A1 | 10/2012 | Kocurek | |
| 2013/0062049 | A1 | 3/2013 | Ren et al. | |
| 2013/0256991 | A1 | 10/2013 | Ramon et al. | |
| 2013/0313780 | A1 | 11/2013 | Johnson et al. | |
| 2014/0020910 | A1 * | 1/2014 | Falkner | E21B 33/12 |
| | | | | 166/381 |

\* cited by examiner

SWAB-RESISTANT DOWNHOLE TOOLS COMPRISING SEALING ELEMENTS COMPOSED OF SHAPE MEMORY POLYMERS

BACKGROUND

The present disclosure generally relates to swab-resistant downhole tools and, more particularly, to swab-resistant downhole tools comprising sealing elements at least partially composed of a shape memory polymer.

A variety of downhole tools may be used within a wellbore in connection with producing or reworking a hydrocarbon bearing subterranean formation. The downhole tool may comprise a wellbore zonal isolation device capable of fluidly sealing two sections of the wellbore from one another and maintaining differential pressure (i.e., to isolate one pressure zone from another). The wellbore zonal isolation device may be used in direct contact with the formation face of the wellbore, with casing string, with a screen or wire mesh, and the like.

Typically, the wellbore zonal isolation device will be introduced and/or withdrawn from the well on a tool string (i.e., a mechanical connection to the surface), such as a tubular string or wireline during certain procedures involved in completion and/or workover operations. The tool string is then introduced into the wellbore concentrically through another tubular conduit, which may be the wellbore itself, casing, or a larger inner diameter production or work string. In other examples, the wellbore zonal isolation device may be pumped into the well, such as by using hydraulic forces to propel the device in or out of the wellbore.

The wellbore zonal isolation device may comprise a body and a sealing element disposed thereon which is traditionally manipulated by hydraulic, mechanical, or electric means to cause the sealing element to expand outwardly into a sealing engagement along the inner diameter of the second or outer conduit, such as the inner smooth wall of casing or the formation face of the wellbore. In such "set" position, the sealing element of the downhole tool will prevent transmission of fluids there across to isolate one portion of the wellbore from another portion.

It may be desirable to run the downhole tool into and out of the well as quickly as possible, in order to reduce the time of a trip into and/or out of the hole and to thereby reduce labor and other operational costs. In many cases, a trip into or out of the wellbore is extended to avoid "swabbing" of the sealing element onto the inner diameter of the outer conduit, casing, or formation face. It is believed that when fluid within the wellbore flows over the sealing element during movement of the tool string, a higher velocity fluid on the outside of the sealing element. This causes a pressure drop that urges the sealing element outward to form a temporary seal with the face of the outer conduit. When so sealed, the tool string, when moved, swabs or carries fluid with it and can cause the wellbore zonal isolation device to prematurely activate or damage or destroy the sealing element. This, in turn, requires a substantial reduction in the rate of movement of the tool string through the wellbore, as much lower run-in speeds must be used in order to avoid swabbing any parts of the wellbore zonal isolation device.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
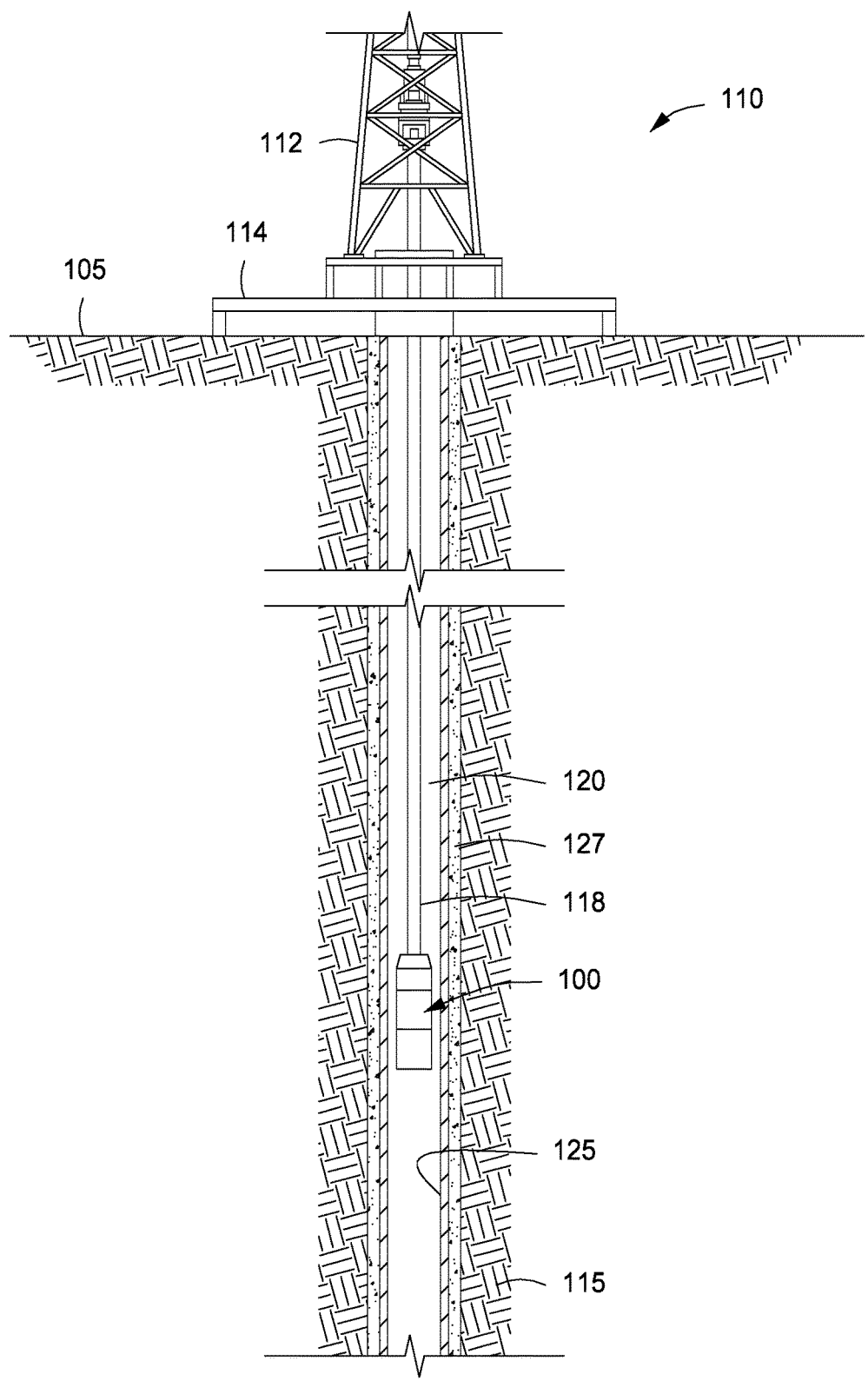
FIG. 1 illustrates a cross-sectional view of a well system comprising a downhole tool, according to one or more embodiments described herein.

The present disclosure generally relates to swab-resistant downhole tools and, more particularly, to swab-resistant downhole tools comprising sealing elements at least partially composed of a shape memory polymer. As used herein, the term "swab-resistant downhole tool" refers to a downhole tool that resists forming a seal, or partial seal, with the inner diameter of the outer conduit, casing, or formation face, and thereby resists creating an undesirable a pressure drop within the wellbore during run-in or out. The downhole tools disclosed herein comprise a body and a sealing element, wherein at least a portion of the sealing element comprises the shape memory polymer. As discussed in more detail below, the shape memory polymer may exhibit a rigid characteristic at temperatures below a glass transition temperature ("Tg") and a resilient characteristic at temperatures above a glass transition temperature. Accordingly, as the downhole tool may be designed such that the shape memory polymer is rigid as it is initially run into the wellbore, thus allowing a high run-in rate (and little or no swabbing) until a particular depth of the wellbore is reached where the temperature is elevated above the glass transition temperature, thus permitting the sealing element to expand and fluidly seal two sections of the wellbore (e.g., casing or the face of the wellbore).

Although the embodiments herein generally describe a downhole tool comprising a sealing element that is composed at least partially of the shape memory polymer, other portions of the downhole tool that desirably have a rubber characteristic may further be composed of at least partially of the shape memory polymer(s) described herein, without departing from the scope of the present disclosure. Such elements may include, but are not limited to, end elements, o-rings (or back-ups thereof), compression set elements, swellable elements, a combination of swellable and compression set elements, and the like, and combinations thereof. For example, the back-up o-ring may be in a series of o-rings with a traditional nitrile o-ring, for example, and could serve to form a seal when such nitrile o-ring fails.

The downhole tool may be any wellbore zonal isolation device, such as a frac plug, a bridge plug, or a packer, a wiper plug, a cement plug, or any other tool requiring a sealing element for use in a downhole operation. In some embodiments, the entirety of the sealing element may be made of the shape memory polymer. In other embodiments, only a portion of the sealing element may be made of the shape memory polymer.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressed in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Referring now to FIG. 1, illustrated is an exemplary well system 110 for a downhole tool 100. As depicted, a derrick 112 with a rig floor 114 is positioned on the earth's surface 105. A wellbore 120 is positioned below the derrick 112 and the rig floor 114 and extends into subterranean formation 115. As shown, the wellbore may be lined with casing 125 that is cemented into place with cement 127. It will be appreciated that although FIG. 1 depicts the wellbore 120 having a casing 125 being cemented into place with cement 127, the wellbore 120 may be wholly or partially cased and wholly or partially cemented (i.e., the casing wholly or partially span the wellbore and may or may not be wholly or partially cemented in place), without departing from the scope of the present disclosure. Moreover, the wellbore 120 may be an open-hole wellbore. A tool string 118 extends from the derrick 112 and the rig floor 114 downwardly into the wellbore 120. The tool string 118 may be any mechanical connection to the surface, such as, for example, wireline, slickline, jointed pipe, or coiled tubing. As depicted, the tool string 118 suspends the downhole tool 100 for placement into the wellbore 120 at a desired location to perform a specific downhole operation. As previously mentioned, the downhole tool 100 may be any type of wellbore zonal isolation device including, but not limited to, a frac plug, a bridge plug, a packer, a wiper plug, or a cement plug.

It will be appreciated by one of skill in the art that the well system 110 of FIG. 1 is merely one example of a wide variety of well systems in which the principles of the present disclosure may be utilized. Accordingly, it will be appreciated that the principles of this disclosure are not necessarily limited to any of the details of the depicted well system 110, or the various components thereof, depicted in the drawings or otherwise described herein. For example, it is not necessary in keeping with the principles of this disclosure for the wellbore 120 to include a generally vertical cased section. The well system 110 may equally be employed in vertical and/or deviated wellbores, without departing from the scope of the present disclosure. Furthermore, it is not necessary for a single downhole tool 100 to be suspended from the tool string 118.

In addition, it is not necessary for the downhole tool 100 to be lowered into the wellbore 120 using the derrick 112. Rather, any other type of device suitable for lowering the downhole tool 100 into the wellbore 120 for placement at a desired location may be utilized without departing from the scope of the present disclosure such as, for example, mobile workover rigs, well servicing units, and the like. Similarly, the downhole tool 100 may be pumped into the wellbore 120 using hydraulic forces generated with a pump.

Although not depicted, the structure of the downhole tool 100 may take on a variety of forms to provide fluid sealing between two wellbore sections. Generally, the downhole tool 100, regardless of its specific structure as a specific type of wellbore zonal isolation device, may comprise a body and a sealing element.

Figure 2:
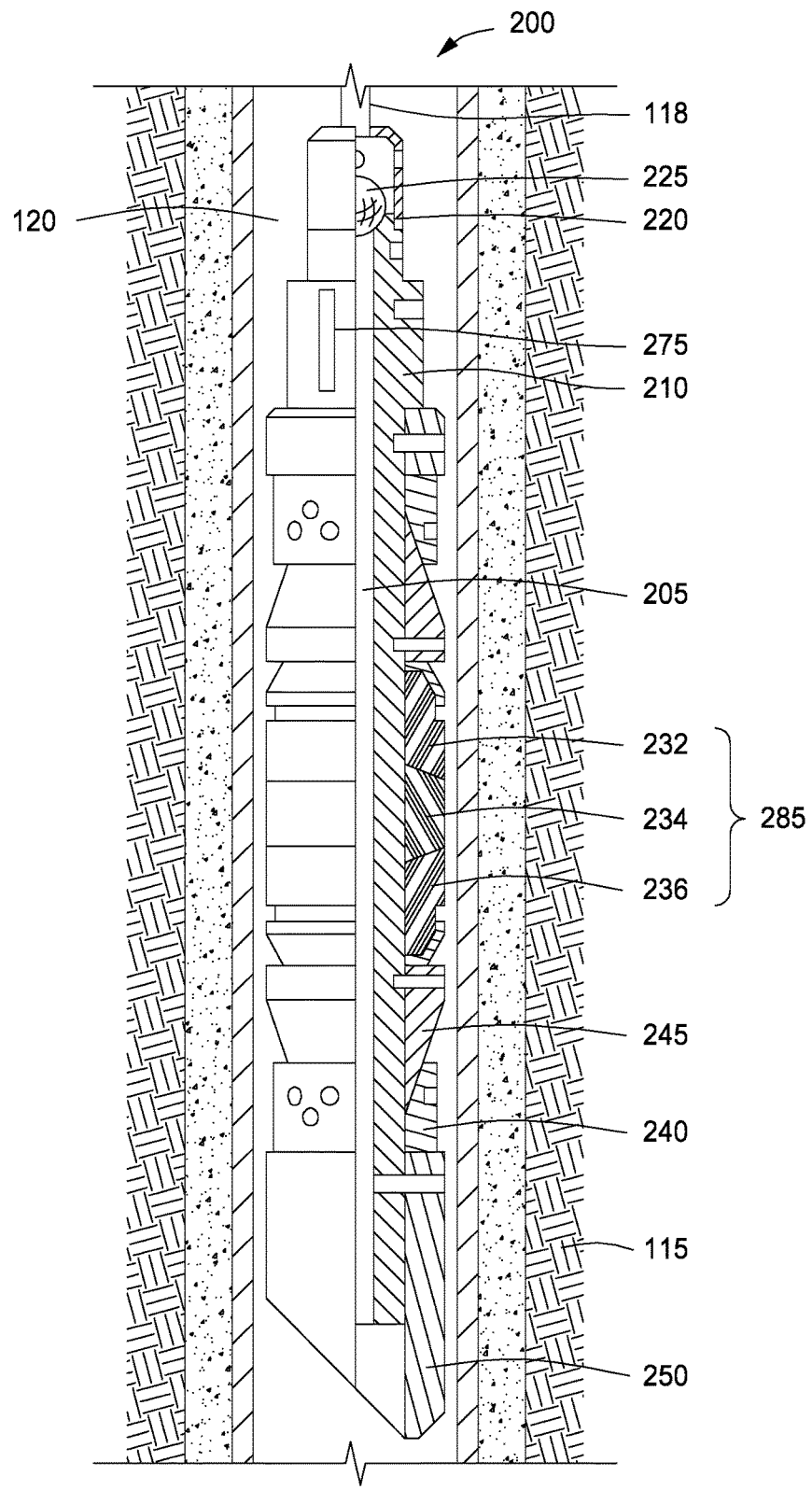
FIG. 2 depicts an enlarged cross-sectional view of a downhole tool, according to one or more embodiments described herein.

Referring now to FIG. 2, with continued reference to FIG. 1, one specific type of downhole tool described herein is a frac plug wellbore zonal isolation device for use during a well stimulation/fracturing operation. FIG. 2 illustrates a cross-sectional view of an exemplary frac plug 200 being lowered into a wellbore 120 on a tool string 118. As previously mentioned, the frac plug 200 may comprise a body 210 and a sealing element 285. The sealing element 285, as depicted, comprises an upper sealing element 232, a center sealing element 234, and a lower sealing element 236. It will be appreciated that although the sealing element 285 is shown as having three portions (i.e., the upper sealing element 232, the center sealing element 234, and the lower sealing element 236), any other number of portions, or a single portion, may also be employed without departing from the scope of the present disclosure.

As depicted, the sealing element 285 is extending around the body 210; however, it may be of any other configuration suitable for allowing the sealing element 285 to form a fluid seal in the wellbore 120, without departing from the scope of the present disclosure. For example, in some embodiments, the body may comprise two sections joined together by the sealing element, such that the two sections of the body compress to permit the sealing element to make a fluid seal in the wellbore 120. Other such configurations are also suitable for use in the embodiments described herein. Moreover, although the sealing element 285 is depicted as located in a center section of the body 210, it will be appreciated that it may be located at any location along the length of the body 210, without departing from the scope of the present disclosure.

The body 210 of the frac plug 200 comprises an axial flowbore 205 extending therethrough. A cage 220 is formed at the upper end of the body 210 for retaining a ball 225 that acts as a one-way check valve. In particular, the ball 225 seals off the flowbore 205 to prevent flow downwardly therethrough, but permits flow upwardly through the flowbore 205. One or more slips 240 are mounted around the body 210 below the sealing element 285. Although not shown, additional slips 240 may be located above the sealing element 285. The slips 240 are guided by a mechanical body slip 245. A tapered shoe 250 is provided at the lower end of the body 210 for guiding and protecting the frac plug 200 as it is lowered into the wellbore 120. An optional enclosure 275 for storing a chemical solution may also be mounted on the body 210 or may be formed integrally therein. In one embodiment, the enclosure 275 is formed of a frangible material.

The shape memory polymers described herein are particularly beneficial in forming the sealing element 285 to reduce swab resistance, because they exhibit varying physical properties based on their glass transition temperature. The glass transition temperature of the shape memory polymers may be dependent on the chemical make-up of the polymer and, thus, can be adjusted by varying the chemical make-up of the polymer (e.g., by changing the type, number, or combination of functional groups, for example). At temperatures above the glass transition temperature, the shape memory polymer may exhibit resilient or rubber-like characteristics, and at temperatures below the glass transition temperature, the shape memory polymer may exhibit rigid or structurally-sturdy characteristics. Accordingly, as the frac plug 200 is run-in the wellbore 120, the sealing element 285 may be designed to at least partially be composed of a shape memory polymer having a glass transition temperature such that during a portion of the run-in, the sealing element exhibits rigid characteristics. As such, during the run-in while the wellbore temperature is below the glass transition temperature, the run-in velocity may be particularly high (e.g., the rate at which the tool string 118 (FIG. 1) may be run into the wellbore 120). This is due to the pumping of fluid causing a portion of the wellbore temperature to be lowered below the geothermal temperature, and may be referred to as an "initial temperature." However, upon reaching deeper locations in the wellbore 120 may recover to near its geothermal temperature, and may increase above the glass transition temperature (referred to as "downhole temperature") of the shape memory polymers and cause the polymers to transition from the rigid characteristic to a resilient characteristic (e.g., become rubbery in nature), allowing the sealing element 285 to form a fluid seal at the desired location. At temperatures above the glass transition temperature of the shape memory polymer, normal, slower run-in times must be used. In some embodiments, the frac plug 200 may be later removed from the wellbore 120 (e.g., such as for a retrievable frac plug 200 or other wellbore zonal isolation device), and as it is removed, it may again encounter the initial temperature below the glass transition temperature and sealing element 285 again exhibit the rigid characteristic and resist swabbing. The type and amount of shape memory polymers used to form the sealing element 285 may thus depend on a number of factors including, but not limited to, the temperature profile of the wellbore 120, the location in which the sealing element 285 is expected to be set, and the like. Such factors may be estimated and included in a program to allow an operator to predict the run-in times for the downhole tool 100 (FIG. 1).

In preferred embodiments, the shape memory polymer has a rigid characteristic modulus over about 1 gigapascal ("GPa") and a resilient characteristic modulus between about 1 megapascal ("MPa") and about 20 MPa, and encompassing any value or subset therebetween. In other embodiments, the shape memory polymer may have a rigid characteristic modulus over about 0.5 GPa. In some embodiments, the glass transition temperature of the shape memory polymer may be in the range of between about 50° C., 55° C., 60° C., 65° C., 70° C., 75° C., 80° C., 85° C., 90° C., 95° C., and 100° C. to about 150° C., 145° C., 140° C., 135° C., 130° C., 125° C., 120° C., 115° C., 110° C., 105° C., and 100° C., encompassing any value and subset therebetween. In yet other embodiments, the glass transition temperature of the shape memory polymer may be in the range of between about 50° C. and 100° C. In still other embodiments, the glass transition temperature of the shape memory polymer may be about 50° C. Generally, it may be preferred that the glass transition temperature range is particularly narrow, so that a sharp transition occurs and that as the temperature continues to increase, the resilient characteristic of the shape memory polymer does not substantially change (i.e., the resilient characteristic and the shape memory polymer does not vary with increasing temperature). Additionally, in preferred embodiments, the shape memory polymer exhibits at least a 5 times change in a mechanical property between the rigid characteristic form and the resilient characteristic form (e.g., about 5 times change in maximum elastic strain or, alternatively about 5 times change in the modulus of elasticity). The glass transition temperature is generally a range of temperature over which the properties change. In one embodiment, the term "above the glass transition temperature," and grammatical variants thereof, refers to temperatures at least above the start of the glass transition temperature range. In one embodiment, the term "below the glass transition temperature," and grammatical variants thereof, refers to temperatures at least below the stop of the glass transition temperature range.

One example of a shape memory polymer may be a thiol-based polymer in an amount sufficient to cause the sealing element to expand and fluidly seal sections of the wellbore 120 upon encountering a temperature above the glass transition temperature of the thiol-based polymer, as described in more detail below. The thiol-based polymer may comprise at least one thiol functional group. In some embodiments, the thiol-based polymer may comprise thiol functional groups in the range of from a lower limit of about 1, 2, 3, 4, 5, 6, 7, 8, 9, 10, and 11 to an upper limit of about 22, 21, 20, 19, 18, 17, 16, 15, 14, 13, 12, and 11. In other embodiments, the thiol-based polymer may comprise even a greater number of thiol functional groups.

The thiol-based polymer may be, but is not limited to, a thiol-ene reaction product, a thiol-yne reaction product, a thiol-epoxy reaction product, and any combination thereof. The thiol-based polymers, whether the reaction product of thiol-ene, thiol-yne, or thiol-epoxy, may be referred to herein as generally being the reaction product of a thiol functional group and an unsaturated functional group. The thiol functional group is an organosulfur compound that contains a carbon-bonded sulfhydryl, represented by the formula —C—SH or R—SH, where R represents an alkane, alkene, alkyne, or other carbon-containing group of atoms.

The thiol-based polymers described herein may be formed by click chemistry. As used herein, the term "click chemistry," and grammatical variants thereof, refers to a chemical reaction of generating substances by joining small modular units. Click chemistry results in the formation of such substances quickly and reliably. That is, the reactions are efficient, high yielding, and tolerant of various solvents and functional groups. In some embodiments, the click chemistry may be capable of forming the thiol-based polymers described herein in less than about 30 minutes. In other embodiments, the click chemistry may be capable of forming the thiol-based polymers described herein in less than about 25 minutes, 20 minutes, 15 minutes, 10 minutes, and 5 minutes. Accordingly, the thiol-based polymers described herein may be formed easily for use in a sealing element 285, thereby reducing associated costs.

The thiol-ene reaction product may be formed by click chemistry by the addition of a S—H bond across a double or triple bond by either a free radical or ionic mechanism. Thiol-ene reactions may be characterized as the sulfur version of a hydrosilylation reaction. The thiol-ene reaction product may be formed by the reaction of at least one thiol functional group with a variety of unsaturated functional groups including, but not limited to, a maleimide, an acrylate, a norborene, a carbon-carbon double bond, a silane, a Michael-type nucleophilic addition, and any combination thereof. As used herein, the term "Michael-type nucleophilic addition," and grammatical variants thereof, refers to the nucleophilic addition of a carbanion or another nucleophile to an α,β-unsaturated carbonyl compound, having the general structure (O=C)—$C^\alpha$=$C^\beta$—. An example of a suitable thiol-ene reaction produce may include, but is not limited to, 1,3,5,-triacryloylhexahydro-1,3,5-triazine. Examples of suitable thiol-ene/silane reaction products that may be used in forming at least a portion of the sealing element 285, but are not limited to, the following Formulas 1-6:

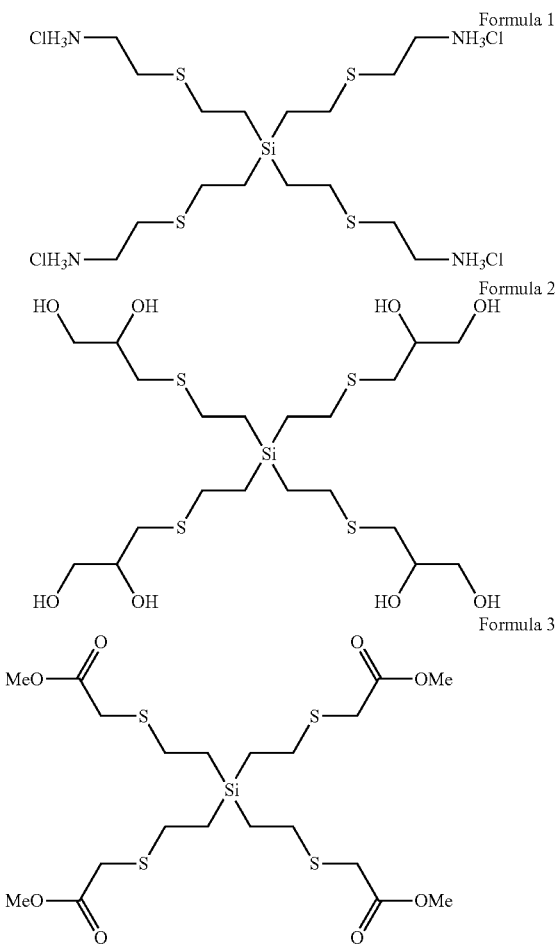

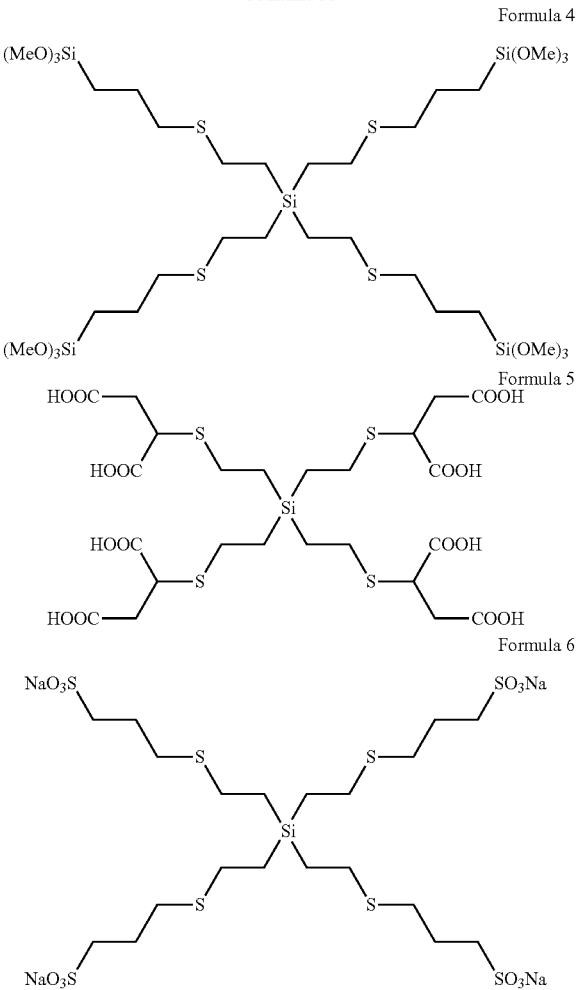

The thiol-yne reaction products may be characterized by an organic addition reaction between a thiol functional group and an alkyne, the alkyne being an unsaturated hydrocarbon having at least one carbon-carbon triple bond. The addition reaction may be facilitated by a radical initiator or UV irradiation and proceeds through a sulfanyl radical species. The reaction may also be amine-mediated, or transition-metal catalyzed.

The thiol-epoxy reaction products may be prepared by a thiol-ene reaction with at least one epoxide functional group. Suitable epoxide functional groups may include, but are not limited to, a glycidyl ether, a glycidyl amine, or as part of an aliphatic ring system. Specific examples of epoxide functional groups may include, but are not limited to, bisphenol-A diglycidyl ether, triglycidylisocyanurate, trimethylolpropane triglycidyl ether, and any combination thereof. The thiol-epoxy reaction products may proceed by one or more of the mechanisms presented below; however, other mechanisms may also be used without departing from the scope of the present disclosure:

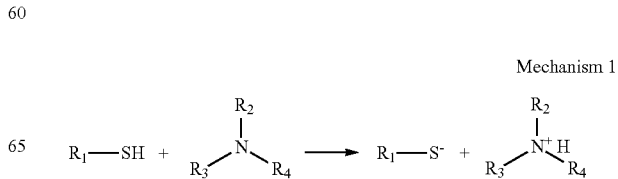

Mechanism 1

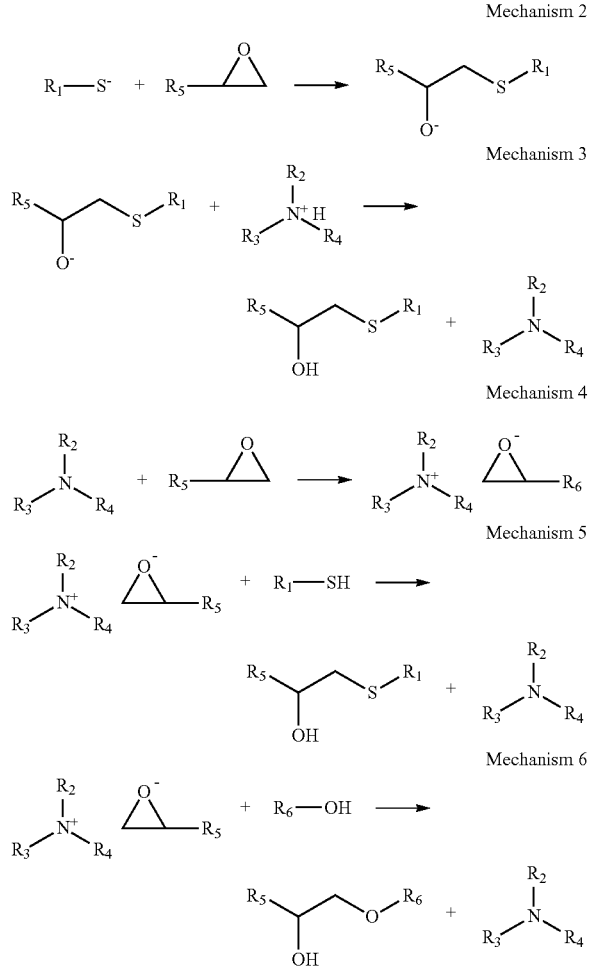

Another shape memory polymer that may be preferred for use in forming at least a portion of the sealing element 285 may be an amorphous plastic, which often exhibit sharp changes in physical properties around the glass transition temperature. The amorphous plastic may further be semi-crystalized in order to increase the strength properties of the polymer, or may be fully crystalized in order to further increase the strength properties of the polymer. Generally, at temperatures below the glass transition temperature, the amorphous plastic comprises random arrangement of polymer chains, similar to the random molecular arrangement found in glass, and thus exhibits the rigid characteristic. However, at temperatures above the glass transition temperature, the polymer chains have sufficient thermal energy to rotate, and the amorphous plastic exhibits the resilient characteristic. Specific suitable amorphous plastics may include, but are not limited to, polystyrene (Tg=~100° C.), polymethylmethacrylate (Tg=~105° C.), polyvinylchloride (Tg=~65° C.), polyethylene terephthalate (Tg=~70° C.), polyphenylene sulfide (Tg=~90° C.), polycaprolactam (Tg=~50° C.), and any combination thereof. Accordingly, a downhole tool 100 (FIG. 1) having a sealing element 285 formed at least partially of the amorphous plastic may be set in a wellbore at a desired depth in the wellbore having an ambient temperature of greater than the glass transition temperature, in some cases substantially greater than the glass transition temperature.

In some embodiments, a portion of the sealing element 285 may be comprised of a shape memory polymer and a rubber. That is, the sealing element may be a traditional rubber, including natural rubber (i.e., cis-1,4-polyisoprene) and synthetic rubbers, or a combination thereof, embedded with the shape memory polymers described herein. By embedding the shape memory polymers into the rubber (e.g., rubber that traditionally forms a sealing element 285), the shape memory polymer may serve to impart structurally rigid characteristics at temperatures below the Tg and additional resilient characteristics at temperatures above the Tg. Such embedded shape memory polymers may be in any form including, but not limited to spherical and non-spherical particulates, fibers, rods, fiber weaves, and the like, and any combination thereof. Suitable synthetic rubbers may include, but are not limited to, nitrile butadiene rubber, hydrogenated nitrile butadiene rubber, ethylene propylene diene M-class rubber, isoprene rubber, isobutylene rubber, polyisobutene rubber, styrene-butadiene rubber, silicone rubber, ethylene propylene rubber, butyl rubber, norbornene rubber, polynorbornene rubber, a block polymer of styrene, a block polymer of styrene and butadiene, a block polymer of styrene and isoprene, and any combination thereof.

In yet other embodiments, the sealing element 285 may comprise a rubber component and a sheath or "sock" encapsulating the rubber component, the sheath composed of the shape memory polymer. That is, the shape memory polymer may be initially heated to a temperature above the glass transition temperature and positioned around the rubber portion of the sealing element 285, then allowed to cool to a temperature below the glass transition temperature and, thus, exhibiting the rigid characteristic. Then, as the downhole tool 100 (FIG. 1) is run downhole, the shape memory sheath of the sealing element 285 exhibits its rigid characteristic and is resistant to swabbing at surface temperatures and initial wellbore temperatures lowered below the geothermal temperature due to contact with pumped fluids. At downhole temperatures above the glass transition temperature, the shape memory polymer may exhibit the resilient characteristic and permit the sealing element 285 to form a fluid seal in the wellbore 120. In some embodiments, the rubber component may further comprise a shape memory polymer embedded therein, in accordance with the embodiments described above.

In still other embodiments, the sealing element 285 may comprise a shape memory polymer component and a sheath or "sock" encapsulating the shape memory polymer component, the sheath composed of a rubber. That is, the rubber may be positioned around the shape memory polymer portion of the sealing element 285. Under conditions above the glass transition temperature of the shape memory polymer, the shape memory polymer component may exhibit rigid characteristics, thereby allowing the sealing element 285, and rubber sleeve component thereof, to resist swabbing. At downhole temperatures above the glass transition temperature, the shape polymer may exhibit the resilient characteristic and permit the sealing element 285 to form a fluid seal in the wellbore 120. In some embodiments, the shape memory polymer component may further comprise a rubber mixture (e.g., the shape memory polymer may be embedded in the rubber), in accordance with the embodiments described above.

Figure 3:
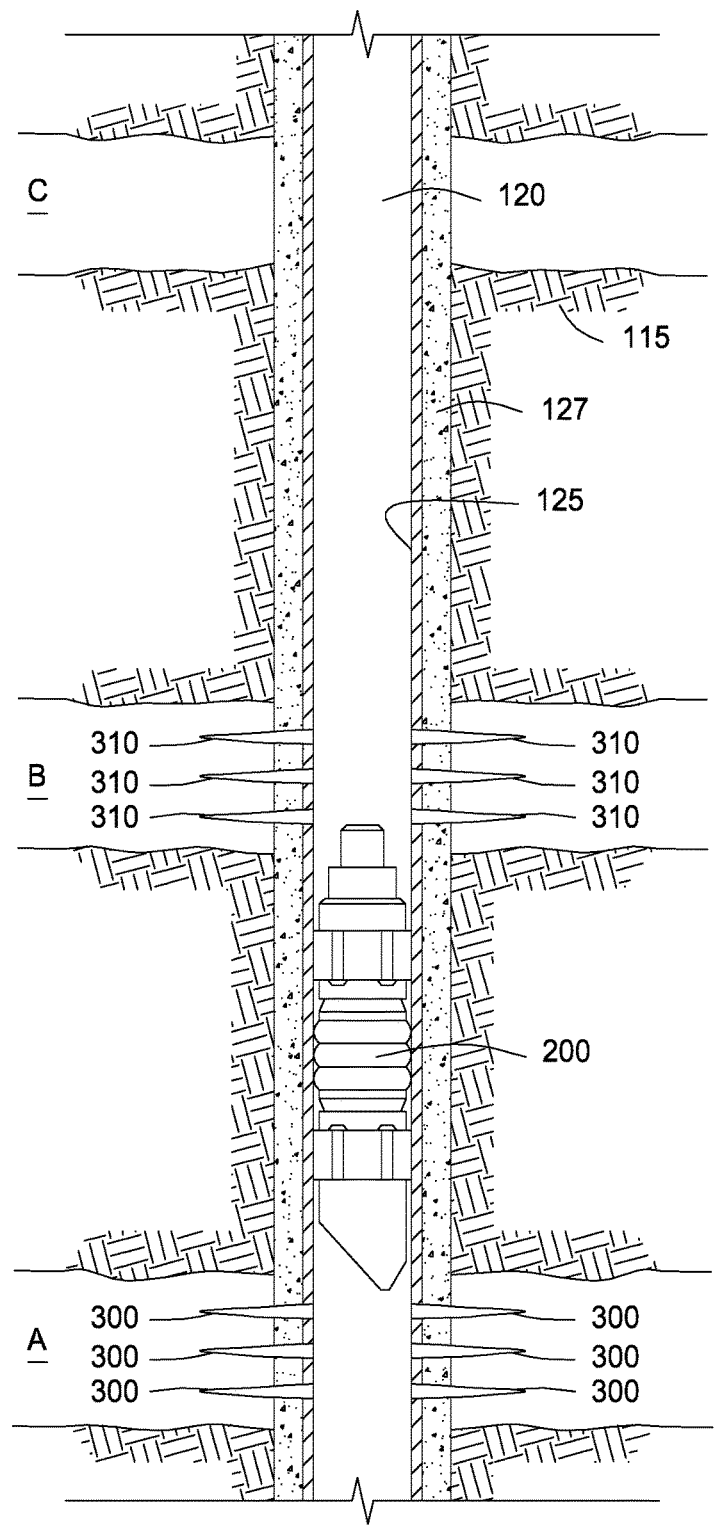
FIG. 3 shows an enlarged cross-sectional view of a downhole tool in operation, according to one or more embodiments described herein.

Referring again to FIG. 2, in operation the frac plug 200 may be used in a downhole fracturing operation to isolate a zone of the formation 115 below the plug 200, the zone having a glass transition temperature above the shape memory polymer forming at least a portion of the sealing element 285 (or another rubber element of the frac plug 200). Referring now to FIG. 3, with continued reference to FIG. 2, the frac plug 200 is shown disposed between producing zone A and producing zone B in formation 115. In a conventional fracturing operation, before setting the frac plug 200 to isolate zone A from zone B, a plurality of perforations 300 are made by a perforating tool (not shown) through the casing 125 and cement 127 to extend into producing zone A. Then a well stimulation fluid is introduced into the wellbore 120, such as by lowering a tool (not shown) into the wellbore 120 for discharging the fluid at a relatively high pressure or by pumping the fluid directly from the derrick 112 (FIG. 1) into the wellbore 120. The well stimulation fluid passes through the perforations 300 into producing zone A of the formation 115 for stimulating the recovery of fluids in the form of oil and gas containing hydrocarbons. These production fluids pass from zone A, through the perforations 300, and up the wellbore 120 for recovery at the surface 105 (FIG. 1).

The frac plug 200 is then lowered by the tool string 118 (FIG. 1) to the desired depth within the wellbore 120, and the sealing element 285 (FIG. 2) is set against the casing 125, thereby isolating zone A as depicted in FIG. 3. Due to the design of the frac plug 200, the flowbore 205 (FIG. 2) of the frac plug 200 allows fluid from isolated zone A to flow upwardly through the frac plug 200 while preventing flow downwardly into the isolated zone A. Accordingly, the production fluids from zone A continue to pass through the perforations 300, into the wellbore 120, and upwardly through the flowbore 205 of the frac plug 200, before flowing into the wellbore 120 above the frac plug 200 for recovery at the surface 105.

After the frac plug 200 is set into position, as shown in FIG. 3, a second set of perforations 310 may then be formed through the casing 125 and cement 127 adjacent intermediate producing zone B of the formation 115. Zone B is then treated with well stimulation fluid, causing the recovered fluids from zone B to pass through the perforations 310 into the wellbore 120. In this area of the wellbore 120 above the frac plug 200, the recovered fluids from zone B will mix with the recovered fluids from zone A before flowing upwardly within the wellbore 120 for recovery at the surface 105.

If additional fracturing operations will be performed, such as recovering hydrocarbons from zone C, additional frac plugs 200 may be installed within the wellbore 120 to isolate each zone of the formation 115. Each frac plug 200 allows fluid to flow upwardly therethrough from the lowermost zone A to the uppermost zone C of the formation 115, but pressurized fluid cannot flow downwardly through the frac plug 200.

While various embodiments have been shown and described herein, modifications may be made by one skilled in the art without departing from the scope of the present disclosure. The embodiments described here are exemplary only, and are not intended to be limiting. Many variations, combinations, and modifications of the embodiments disclosed herein are possible and are within the scope of the disclosure. Accordingly, the scope of protection is not limited by the description set out above, but is defined by the claims which follow, that scope including all equivalents of the subject matter of the claims.

Embodiments disclosed herein include Embodiment A, Embodiment B, and Embodiment C.

Embodiment A

A swab-resistant downhole tool comprising a body and a sealing element, wherein at least a portion of the sealing element is composed of a shape memory polymer, the shape memory polymer having a glass transition temperature ("Tg"), and exhibiting a resilient characteristic above the Tg and a rigid characteristic below the Tg, and wherein the Tg is in the range of about 50° C. to about 150° C.

Embodiment A may have one or more of the following additional elements in any combination:

Element A1: Wherein the shape memory polymer is selected from the group consisting of a thiol-based polymer, an amorphous plastic, and any combination thereof.

Element A2: Wherein the thiol-based polymer is selected from the group consisting of a thiol-ene reaction product, a thiol-yne reaction product, a thiol-epoxy reaction product, and any combination thereof.

Element A3: Wherein the amorphous plastic is selected from the group consisting of polystyrene, polymethylmethacrylate, polyvinylchloride, polyethylene terephthalate, polyphenylene sulfide, polycaprolactam, and any combination thereof.

Element A4: Wherein the portion of the sealing element that is composed of the shape memory polymer encapsulates a rubber component.

Element A5: Wherein the portion of the sealing element that is composed of the shape memory polymer is encapsulated by rubber.

By way of non-limiting example, exemplary combinations applicable to Embodiment A include: A1 and A2; A1 and A3; A1, A2, and A3; A1 and A4; A1 and A5.

Embodiment B

A method comprising: providing a swab-resistant downhole tool comprising a body and a sealing element, wherein at least a portion of the sealing element is composed of a shape memory polymer, the shape memory polymer having a glass transition temperature ("Tg"), and exhibiting a resilient characteristic above the Tg and a rigid characteristic below the Tg, and introducing the downhole tool into a wellbore having an initial temperature below the Tg such that the sealing element exhibits the rigid characteristic and resists swabbing; setting the downhole tool in the wellbore at a location having a downhole temperature above the Tg such that the sealing element exhibits the resilient characteristic and fluidly seals at least two portions of the wellbore; and performing a downhole operation.

Embodiment B may have one or more of the following additional elements in any combination:

Element B1: Wherein the glass transition temperature is in the range of about 50° C. and about 150° C.

Element B2: Further comprising removing the downhole tool from the wellbore and wherein upon encountering the initial temperature below the glass transition temperature, the sealing element exhibits the rigid characteristic and resists swabbing.

Element B3: Wherein the shape memory polymer is selected from the group consisting of a thiol-based polymer, an amorphous plastic, and any combination thereof.

Element B4: Wherein the thiol-based polymer is selected from the group consisting of a thiol-ene reaction product, a thiol-yne reaction product, a thiol-epoxy reaction product, and any combination thereof.

Element B5: Wherein the amorphous plastic is selected from the group consisting of polystyrene, polymethylmethacrylate, polyvinylchloride, polyethylene terephthalate, polyphenylene sulfide, polycaprolactam, and any combination thereof.

Element B6: Wherein the portion of the sealing element that is composed of the shape memory polymer encapsulates a rubber component.

Element B7: Wherein the portion of the sealing element that is composed of the shape memory polymer is encapsulated by rubber.

By way of non-limiting example, exemplary combinations applicable to Embodiment B include: combinations of B1 and B2; B2 and B3; B1, B2, and B3; B1, B2, and B4; B1, B2, and B5; B1 and B6; B1 and B7; B2 and B6; B2 and B7.

Embodiment C

A system comprising: a wellbore; and a swab-resistant downhole tool comprising a body and a sealing element, wherein at least a portion of the sealing element is composed of a shape memory polymer, the shape memory polymer having a glass transition temperature ("Tg"), and exhibiting a resilient characteristic above the Tg and a rigid characteristic below the Tg, and wherein the swab-resistant downhole tool is capable of being introduced into a wellbore having an initial temperature below the Tg so as to exhibit the rigid characteristic and resist swabbing, and thereafter set at a location in the wellbore having a downhole temperature above the Tg so as to exhibit the resilient characteristic and fluidly seal at least two portions of the wellbore.

Embodiment C may have one or more of the following additional elements in any combination:

Element C1: Wherein the glass transition temperature is in the range of about 50° C. and about 150° C.

Element C2: Wherein the swab-resistant downhole tool is further capable of being removed from the wellbore, and wherein upon encountering the initial temperature below the Tg, the sealing element exhibits the rigid characteristic and resists swabbing.

Element C3: Wherein the shape memory polymer is selected from the group consisting of a thiol-based polymer, an amorphous plastic, and any combination thereof.

Element C4: Wherein the thiol-based polymer is selected from the group consisting of a thiol-ene reaction product, a thiol-yne reaction product, a thiol-epoxy reaction product, and any combination thereof.

Element C5: Wherein the amorphous plastic is selected from the group consisting of polystyrene, polymethylmethacrylate, polyvinylchloride, polyethylene terephthalate, polyphenylene sulfide, polycaprolactam, and any combination thereof.

Element C6: Wherein the portion of the sealing element that is composed of the shape memory polymer encapsulates a rubber component.

Element C7: Wherein the portion of the sealing element that is composed of the shape memory polymer is encapsulated by rubber.

By way of non-limiting example, exemplary combinations applicable to Embodiment C include: C1 and C2; C2 and C3; C1, C2, and C3; C1, C2, and C4; C1, C2, and C5; C1 and C6; C1 and C7; C2 and C6; C2 and C7.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A swab-resistant downhole tool comprising a body and a sealing element,
wherein at least a portion of the sealing element is composed of a shape memory polymer, the shape memory polymer having a glass transition temperature ("Tg"), and exhibiting a resilient characteristic above the Tg and a rigid characteristic below the Tg,
wherein the Tg is in the range of about 50° C. to about 150° C., and
wherein the shape memory polymer has a rigid characteristic modulus over about 1 gigapascal and a resilient characteristic modulus between about 1 megapascal and about 20 megapascal.

2. The swab-resistant downhole tool of claim 1, wherein the shape memory polymer is selected from the group consisting of a thiol-based polymer and an amorphous plastic.

3. The swab-resistant downhole tool of claim 2, wherein the thiol-based polymer is selected from the group consisting of a thiol-ene reaction product, a thiol-yne reaction product and a thiol-epoxy reaction product.

4. The swab-resistant downhole tool of claim 2, wherein the amorphous plastic is selected from the group consisting of polystyrene, polymethylmethacrylate, polyvinylchloride, polyethylene terephthalate, polyphenylene sulfide and polycaprolactam.

5. The swab-resistant downhole tool of claim 1, wherein the portion of the sealing element that is composed of the shape memory polymer encapsulates a rubber component.

6. The swab-resistant downhole tool of claim 1, wherein the portion of the sealing element that is composed of the shape memory polymer is encapsulated by rubber.

7. A method comprising:
providing a swab-resistant downhole tool comprising a body and a sealing element,
wherein at least a portion of the sealing element is composed of a shape memory polymer, the shape memory polymer having a glass transition temperature ("Tg"), and exhibiting a resilient characteristic above the Tg and a rigid characteristic below the Tg, and wherein the shape memory polymer has a rigid characteristic modulus over about 1 gigapascal and a resilient characteristic modulus between about 1 megapascal and about 20 megapascal, and introducing the downhole tool into a wellbore having an initial temperature below the Tg such that the sealing element exhibits the rigid characteristic and resists swabbing;

setting the downhole tool in the wellbore at a location having a downhole temperature above the Tg such that the sealing element exhibits the resilient characteristic and fluidly seals at least two portions of the wellbore; and performing a downhole operation.

8. The method of claim 7, wherein the glass transition temperature is in the range of about 50° C. and about 150° C.

9. The method of claim 7, further comprising removing the downhole tool from the wellbore and wherein upon encountering the initial temperature below the glass transition temperature, the sealing element exhibits the rigid characteristic and resists swabbing.

10. The method of claim 7, wherein the shape memory polymer is selected from the group consisting of a thiol-based polymer and an amorphous plastic.

11. The method of claim 10, wherein the thiol-based polymer is selected from the group consisting of a thiol-ene reaction product, a thiol-yne reaction product and a thiol-epoxy reaction product.

12. The method of claim 10, wherein the amorphous plastic is selected from the group consisting of polystyrene, polymethylmethacrylate, polyvinylchloride, polyethylene terephthalate, polyphenylene sulfide and polycaprolactam.

13. The method of claim 7, wherein the portion of the sealing element that is composed of the shape memory polymer encapsulates a rubber component.

14. The method of claim 7, wherein the portion of the sealing element that is composed of the shape memory polymer is encapsulated by rubber.

15. A system comprising:
a wellbore; and
a swab-resistant downhole tool comprising a body and a sealing element, wherein at least a portion of the sealing element is composed of a shape memory polymer, the shape memory polymer having a glass transition temperature ("Tg"), and exhibiting a resilient characteristic above the Tg and a rigid characteristic below the Tg, and wherein the shape memory polymer has a rigid characteristic modulus over about 1 gigapascal and a resilient characteristic modulus between about 1 megapascal and about 20 megapascal, and wherein the swab-resistant downhole tool is capable of being introduced into a wellbore having an initial temperature below the Tg so as to exhibit the rigid characteristic and resist swabbing, and thereafter set at a location in the wellbore having a downhole temperature above the Tg so as to exhibit the resilient characteristic and fluidly seal at least two portions of the wellbore.

16. The system of claim 15, wherein the glass transition temperature is in the range of about 50° C. and about 150° C.

17. The system of claim 15, wherein the swab-resistant downhole tool is further capable of being removed from the wellbore, and wherein upon encountering the initial temperature below the Tg, the sealing element exhibits the rigid characteristic and resists swabbing.

18. The system of claim 15, wherein the shape memory polymer is selected from the group consisting of a thiol-based polymer and an amorphous plastic.

19. The system of claim 18, wherein the thiol-based polymer is selected from the group consisting of a thiol-ene reaction product, a thiol-yne reaction product and a thiol-epoxy reaction product.

20. The system of claim 18, wherein the amorphous plastic is selected from the group consisting of polystyrene, polymethylmethacrylate, polyvinylchloride, polyethylene terephthalate, polyphenylene sulfide and polycaprolactam.

21. The system of claim 15, wherein the portion of the sealing element that is composed of the shape memory polymer encapsulates a rubber component.

22. The system of claim 15, wherein the portion of the sealing element that is composed of the shape memory polymer is encapsulated by rubber.

* * * * *